Dec. 17, 1597

R. W. JONES 2,816,961

TELEPHONE SYSTEM EMPLOYING IMPULSE RESPONSIVE CROSS BAR SWITCHES

Filed April 29, 1953

6 Sheets-Sheet 1

INVENTOR.
ROY W. JONES
BY Wm. Walter Owen
ATTY.

INVENTOR.
ROY W. JONES
BY Wm. Walter Owen.
ATTY.

Dec. 17, 1597 R. W. JONES 2,816,961

TELEPHONE SYSTEM EMPLOYING IMPULSE RESPONSIVE CROSS BAR SWITCHES

Filed April 29, 1953 6 Sheets-Sheet 3

INVENTOR.
ROY W. JONES
BY [signature]
ATTY.

TO FIG. 1

INVENTOR.
ROY W. JONES
BY [signature]
ATTY.

TELEPHONE SYSTEM EMPLOYING IMPULSE RESPONSIVE CROSS BAR SWITCHES

Filed April 29, 1953

INVENTOR.
ROY W. JONES
BY
ATTY.

Dec. 17, 1597 R. W. JONES 2,816,961

TELEPHONE SYSTEM EMPLOYING IMPULSE RESPONSIVE CROSS BAR SWITCHES

Filed April 29, 1953 6 Sheets-Sheet 6

INVENTOR.
ROY W. JONES
BY [signature]
ATTY.

2,816,961

TELEPHONE SYSTEM EMPLOYING IMPULSE RESPONSIVE CROSS BAR SWITCHES

Roy W. Jones, Rochester, N. Y., assignor to General Telephone Laboratories, Incorporated, a corporation of Delaware Application April 29, 1953, Serial No. 351,796

8 Claims. (Cl. 179—22)

The present invention relates in general to automatic telephone systems, and in particular to automatic telephone systems of the cross-bar type, wherein connections are made through banks, or fields, of parallel bare wire conductors.

The main object of the invention is the provision of complete operating circuits for controlling novel cross-bar switching mechanisms of the type shown and disclosed in Patent 2,680,783, issued to Kenneth W. Graybill and Hans Sengebusch on June 8, 1954.

Another object of the invention is the provision of new and novel circuit arrangements whereby the said cross-bar switching devices may be operated as linefinders, selectors, and connectors, for the establishment of automatic telephone connections, in an operating telephone system.

Other objects and features of the invention will be apparent from the following specification and claims, when considered together with the appended drawings, comprising Figures 1 to 6 inclusive, which show in diagrammatic form, sufficient of the equipment to enable the invention to be described and understood.

Figure 1:
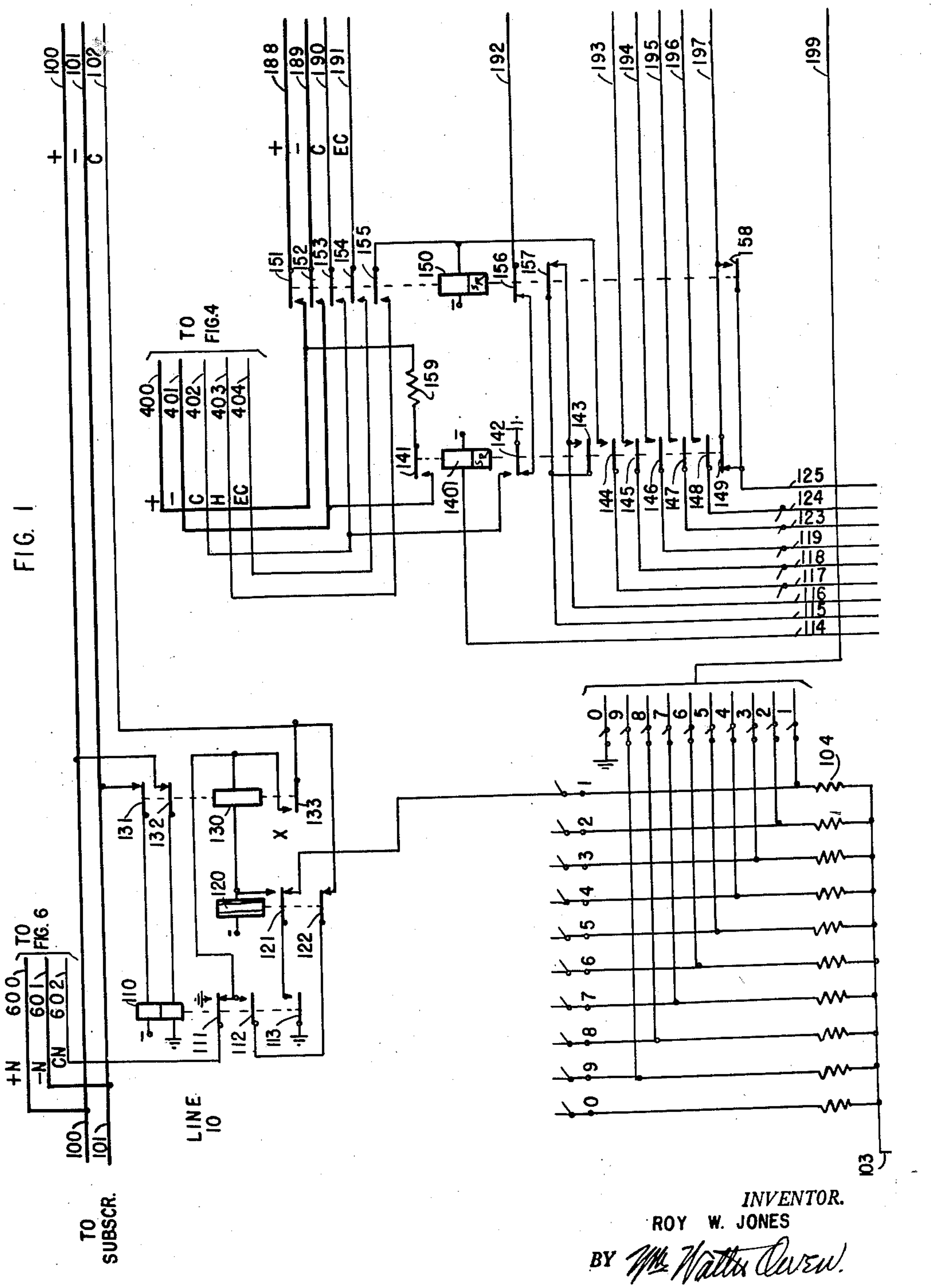

Fig. 1 shows a three relay line circuit individual to a particular subscriber line, a pair of finder control relays individual to a particular linefinder unit, and a level marking network for indicating the tens group of a calling line.

Figure 2:
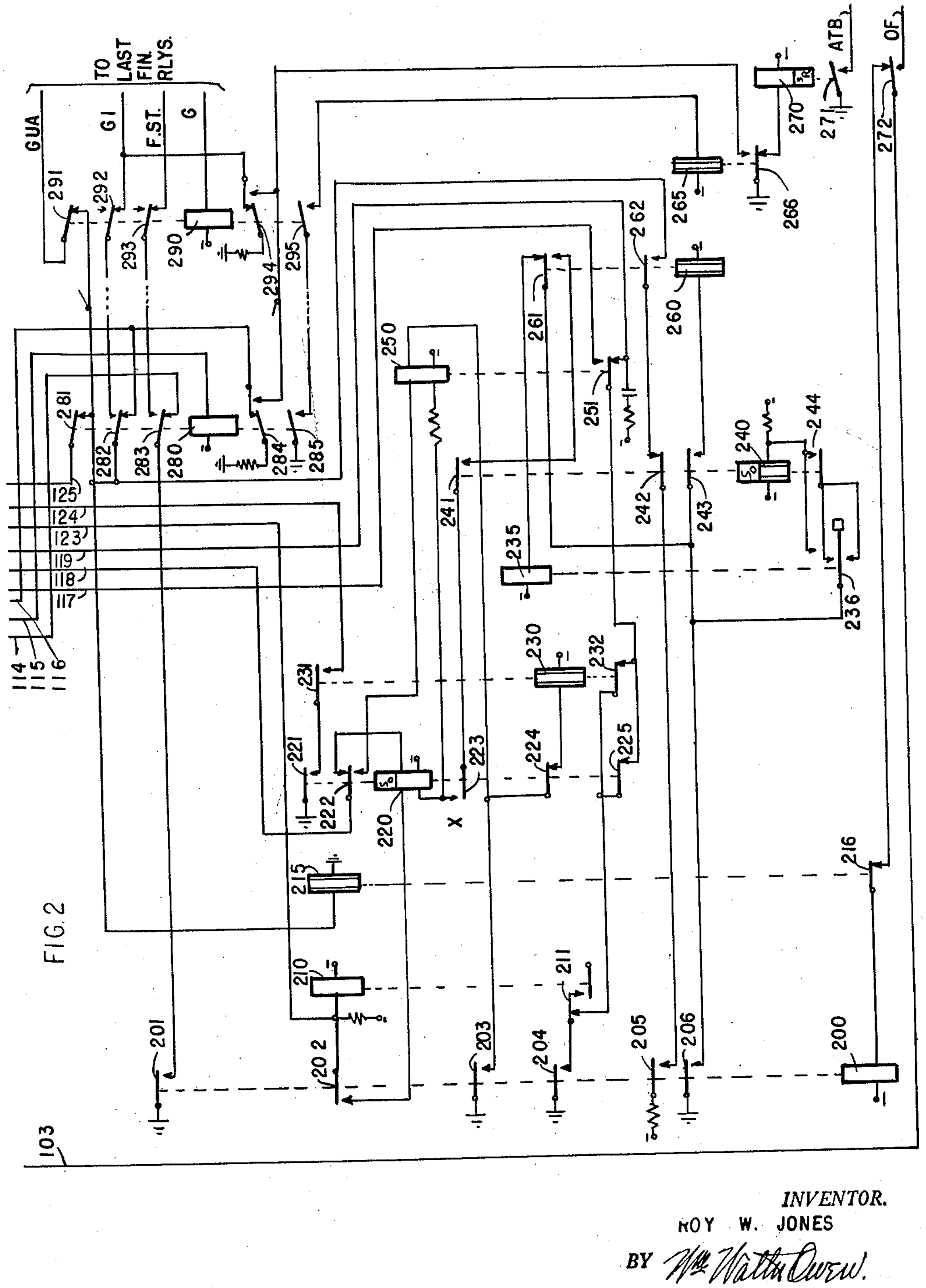

Fig. 2 which goes below Fig. 1, shows a group of common control relays for the linefinders, commonly known as an allotter.

Figure 3:
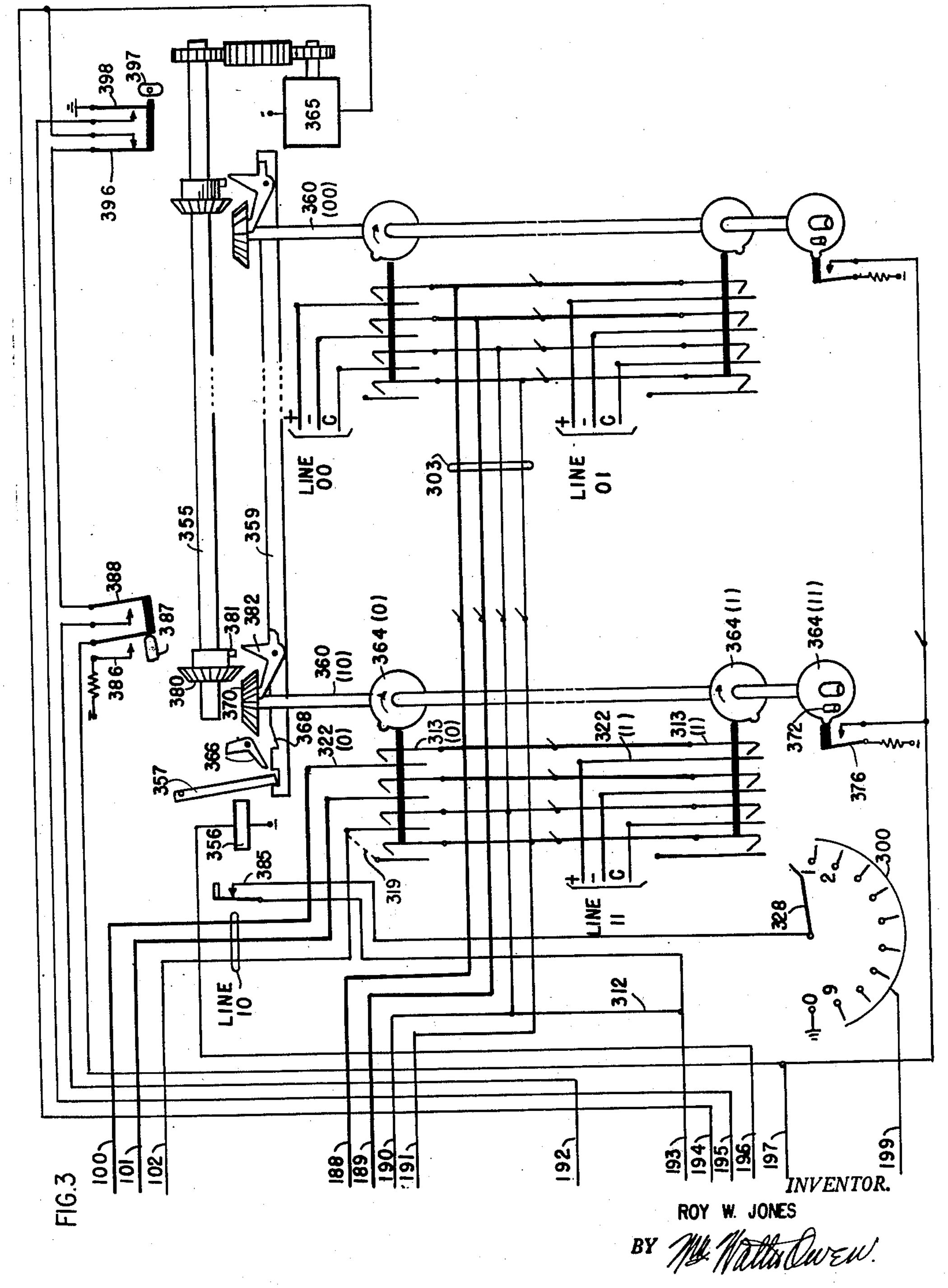

Fig. 3, which goes to the right of Fig. 1, shows one of the cross-bar switching units or mechanisms of the previously mentioned Patent 2,680,783, arranged to operate as a linefinder.

Figure 4:
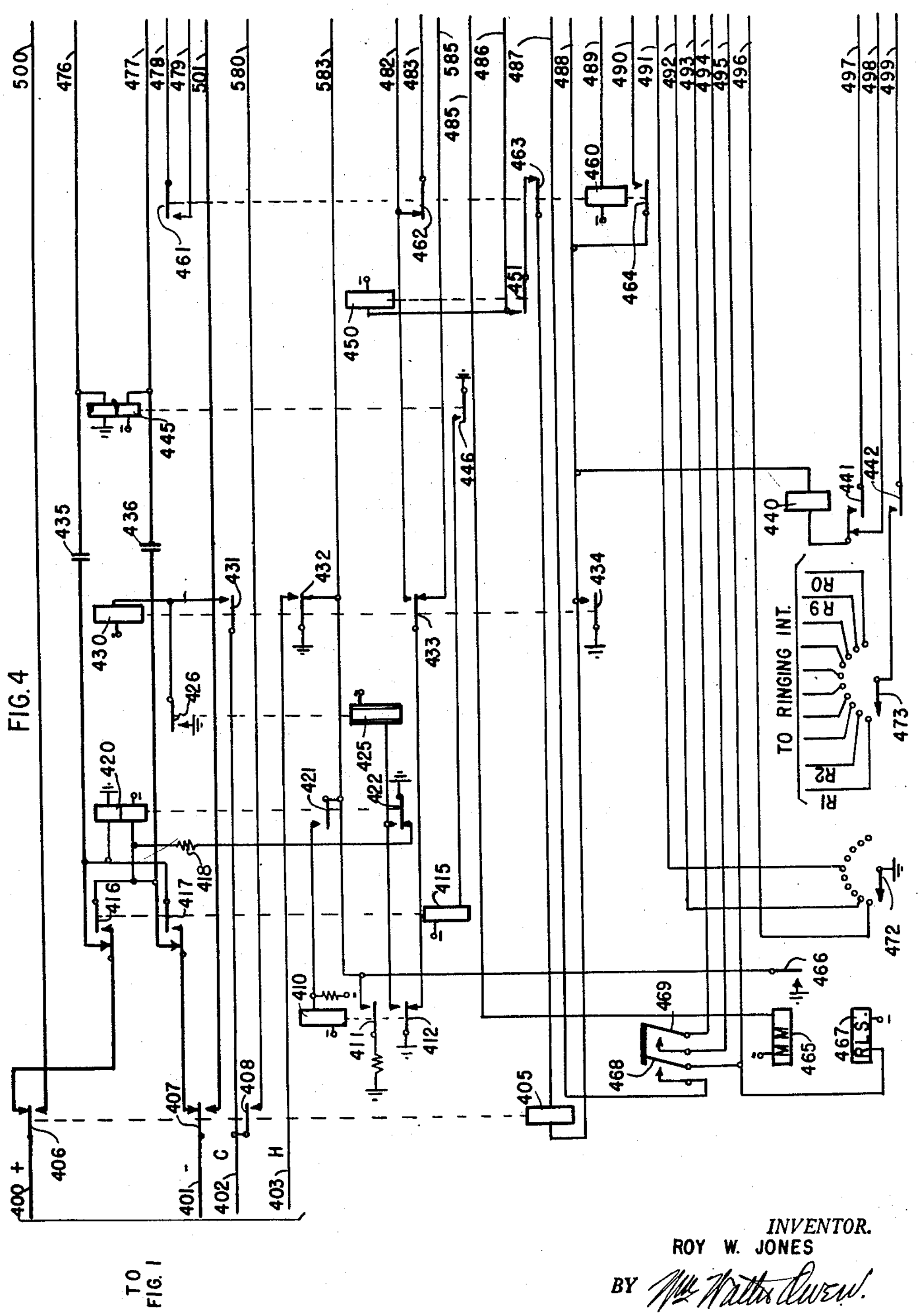

Fig. 4 shows a portion of the control relays for a connector switch assumed to be directly associated with the linefinder of Figs. 1 and 3 in a finder-connector link of a 100 line system.

Figure 5:
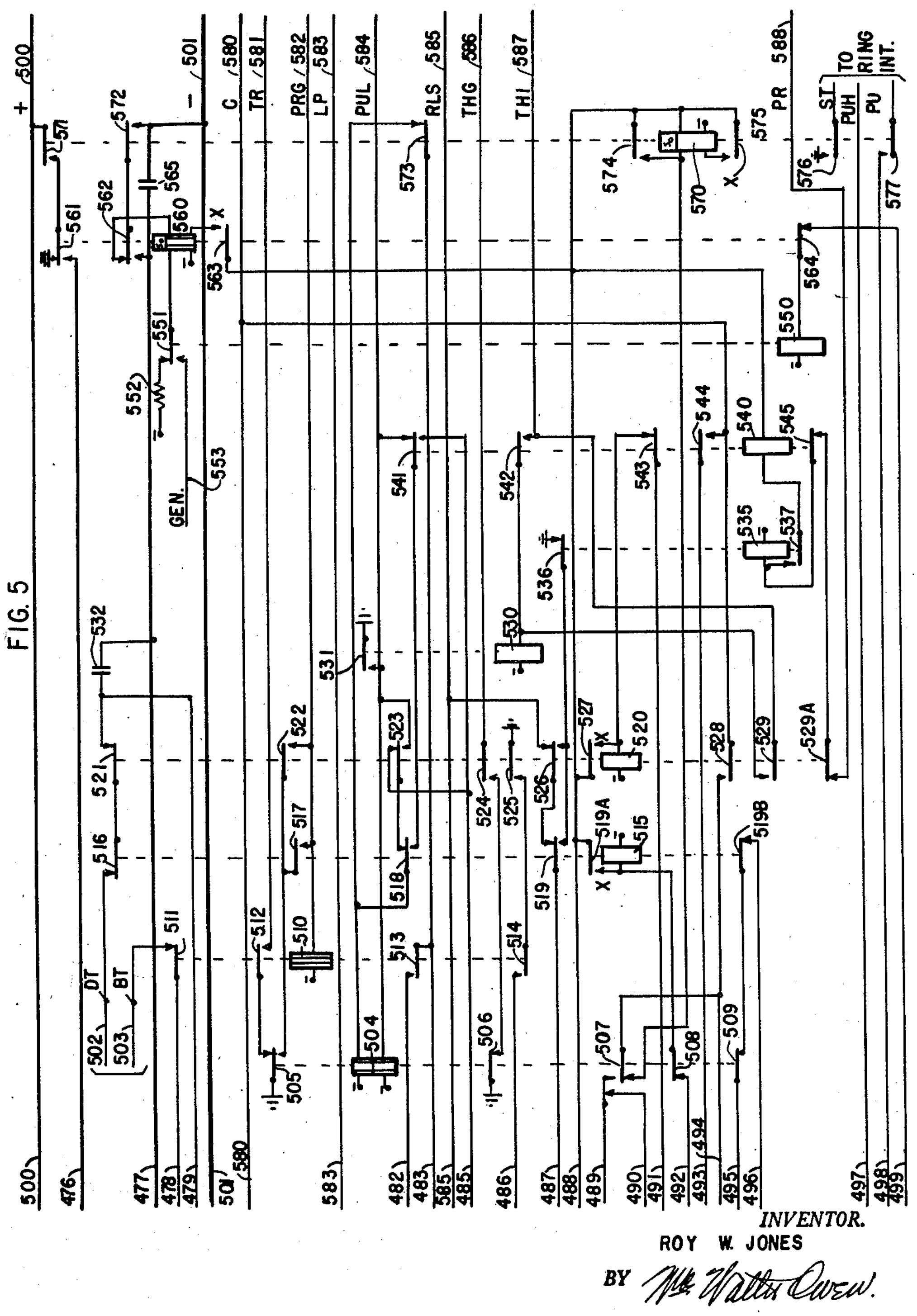

Fig. 5, which goes to the right of Fig. 4, shows the rest of the connector control relays.

Figure 6:
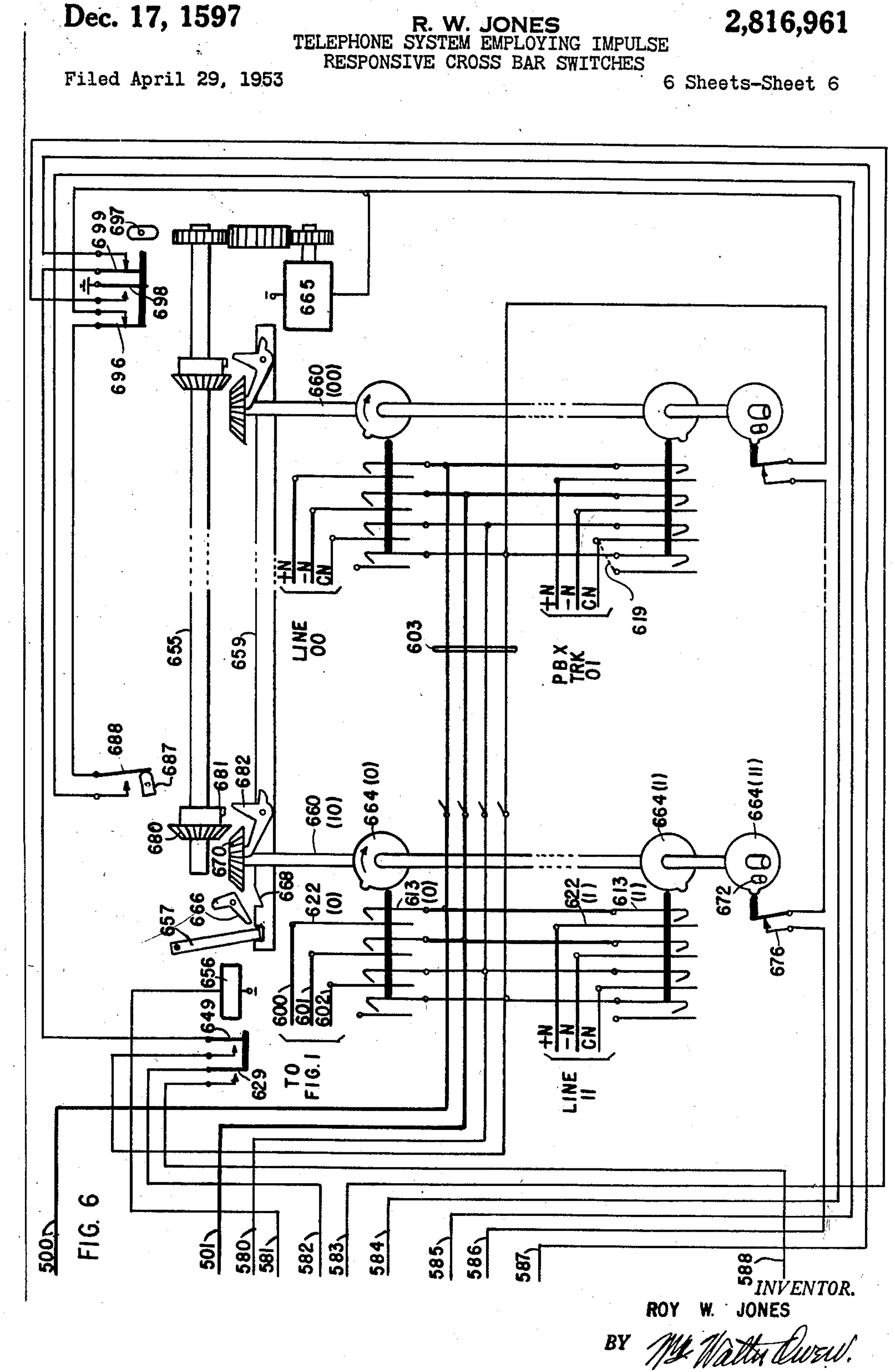

Fig. 6, which goes to the right of Fig. 5, shows one of the cross-bar switching mechanism units, arranged to function as a connector.

With further reference to the switching units of Figs. 3 and 6, the arrangement is substantially identical with that shown in the aforementioned Patent 2,680,783 although illustrated in diagrammatic form. The present units differ however, in the number and arrangement of the contact springs in the various auxiliary contact assemblies such as shaft off-normal springs, motor interrupter springs, and transfer magnet springs, and in the addition in Fig. 3 of a brush or wiper 328, arranged to be driven over a set of contacts by the primary shaft for extending the group or level markings. The numeral designations employed in these two figures have been made to correspond with those of the aforementioned patent, except for the addition of a hundreds numeral, in order to facilitate identification of the different elements.

Each cross-bar switching unit consists essentially of a horizontal primary shaft such as 355 or 655, carrying ten uniformly spaced bevel gears such as 380 or 680 along its length, and ten horizontal secondary or "group" shafts such as 360 or 660 at right angles to the primary shaft, and arranged to be driven on a selective basis by the bevel gears of the primary shaft, through other bevel gears such as 370 or 670 on the end of each group shaft. The primary shaft, and the selected group shaft, are arranged to be driven, through a train of gears, by a pulse motor such as 365 or 665, which is operable by direct-current impulses. Each group shaft carries ten operating cams such as 364(0) or 664(0) evenly spaced along its length, plus one off-normal cam such as 364(11) or 664(11). In the drawings, only the first and last group shafts are illustrated, the eight intermediate shafts being omitted, since they are identical with those shown. For a similar reason, only the first and last of the ten operating cams of the group shafts are illustrated.

Facing each group shaft, and parallel therewith, is a vertical bank or panel of parallel bare-wire vertical conductors such as 322 or 622, uniformly spaced in front of the operating cams of the shaft. Each such vertical panel, in the proposed embodiment, includes a total of 40 such bare-wire conductors, corresponding to 10 subscriber lines or trunks, and the full set of 10 panels would therefore include 400 such conductors, corresponding to 100 subscriber lines or trunks, to which they would be permanently connected as required.

Suspended between the vertical bare-wire conductors of each panel and the operating cams of the associated group shaft, is a row of flexible contact fingers, such as 313 or 613, one for each conductor. These contact fingers are connected together in multiple groups of four, with each group of four arranged to be operated into engagement with the corresponding four vertical conductors, in each of ten predetermined off-normal positions of the associated group shaft. The multipled contact fingers are permanently wired in turn to a local four-wire trunk which is outgoing in the case of a linefinder, and incoming in the case of a connector or selector. Thus, each time a set of contact fingers is caused to engage the bare wire bank, a connection is extended from the said local trunk to a particular subscriber's line, or to another trunk, depending on circumstances.

The general method of operation is as follows. When a call is initiated, the line circuit of the calling line, such as shown at the upper left in Fig. 1, seizes the allotter of Fig. 2, which in turn operates the start relay 140 (Fig. 1) of the preselected linefinder. Relay 140 extends the allotter control circuits through to the preselected linefinder, whereupon the allotter begins to pulse the finder motor 365. The motor 365 thereupon steps the shaft 355 and the wiper 328. When the wiper 328 finds the group marking forwarded by the line circuit of the calling line, the pulsing to the motor is stopped, and a transfer magnet 356, shown at the upper left in Fig. 3, is operated. Transfer magnet 356, by means of its armature 357 pulls a trigger bar 359 to the left, where it is mechanically locked by a bell crank latch 366. As the trigger bar 359 moves to the left, a stud 381 on the hub of one of the ten bevel gears 380 strikes one end of one of ten pivoted triggers 382 carried by trigger bar 359, and rocks it clockwise. The rocked trigger 382 thereupon lifts the associated group shaft and its bevel gear 370 into engagement with the corresponding gear 380. The pulsing to the motor 365 then resumes, and the latter now drives the engaged group shaft 360 as well as the primary shaft. The group shaft then tests the various lines of its group in succession until the marking on the test conductor of the calling line is found. Pulsing to the motor 365 thereupon again stops, and finder switching relay 150 operates and switches the call through to the connector. The allotter is at the same time released, and preselects the next idle finder.

The talking conductors of the calling line are now extended through to the connector of Figs. 4, 5, 6, which returns dial tone. The subscriber then dials the call number of the wanted line, which, in the embodiment of the invention illustrated, would be a four digit number. The first digit operates a small auxiliary stepping switch shown at the lower left in Fig. 4, which determines whether the call is to be a local call or a trunk call. The second digit is repeated to the pulse motor 665 in Fig. 6, to step the primary shaft 655. During the inter-digital pause, transfer magnet 656 is operated, and pulls trigger bar 659 to the left. A stud 681 on the hub of one of the bevel gears 680 thereupon rocks one of the triggers 682, lifting the corresponding bevel gear 670 and its group shaft 660 into engagement with the associated bevel gear 680. The third digit accordingly drives both shafts, and the selected group shaft 660 is caused to extend the connection to the called line. The last digit again steps the auxiliary switch to select the type of ringing. The connector then rings the called line, and completes the connection when the called line answers. When the conversation is completed, and the calling line has released the call, both finder and connector mechanisms are automatically driven back to their home positions by the motors 365 and 665 on a self-interrupted basis.

In practice, a number of switching units will be mounted on the same bare-wire multiple panel, one above the other, the exact number depending on traffic considerations, or the number of simultaneous connections the equipment is required to provide.

*Local call*

The general method of operation having been described, the details of the circuit operation will now be given, by actually tracing the progress of a call step by step through the system, as from a calling line 10 for example, to a called line 11. In the drawings, it has been assumed that the line circuit shown in Fig. 1 is that of line 10, which is indicated as being connected to the bare wire conductors controlled by the upper cam of the left group shaft in both finder and connector, while line 11 is assumed to be connected to the bare wire conductors controlled by the lowermost operating cam of the same shaft, just above the off-normal cam. The lines 12 to 19 are similarly controlled by the intervening cams, not shown, of the same shaft. In like manner, the right hand group shaft of Figs. 3 and 6 serves to make connections to the tenth or "0" group of lines, while the intervening shafts not shown, give access to the second to ninth groups of lines.

When the calling subscriber on line 10 lifts his receiver or handset, line relay 110 of the corresponding line circuit in the exchange is operated from ground and battery through its windings, through break contacts 131, 132 of the line cutoff relay, and through the calling telephone over line wires 100, 101. Line relay 110 upon operating, at contacts 111 grounds the test normal conductor 602 to mark this line busy in the bare wire banks of the connectors, at contacts 112 prepares a circuit for relays 120 and 130, and at contacts 113 extends starting ground to the allotter, and group marking ground to the linefinders. Start relay 200 of the allotter now operates, from ground through contacts 113, 121, resistor 104, lead 103, contacts 272 of the normally operated all-trunks-busy relay 270, contacts 216, and the winding of relay 200 to battery.

The relays 280, 290 of Fig. 2 represent two of a larger group of relays, whose function is to connect the allotter to the linefinders one at a time in rotation. One such relay must be provided for each finder. Only the first and last are shown however, the rest being similar. These relays are normally operated if the corresponding finder is idle, and are released if the corresponding finder is busy. For the purpose of this explanation, it is assumed that all of the finders are idle and all of the relays 280—290 are operated, and held operated, by the corresponding finder connect relay 150. The holding circuit for distributor relay 280 for example, may be traced from resistance ground through make contacts 284, lead 116, break contacts 157, lead 115, and the winding of relay 280 to negative battery. The other relays are held similarly by the other finder connect relays.

When therefore, allotter start relay 200 operates, its contacts 201 extend ground to finder start relay 140 of the first finder, by way of contacts 283 and lead 114. Relay 200 also, at contacts 202 prepares a stopping or test circuit, at contacts 203 operates transfer relay 230 which has only a preparatory function at this time, at contacts 204 prepares the finder stepping circuit, at contacts 205 prepares a kickoff circuit, to be described later, and at contacts 206 operates timing relay 235, by way of break contacts 261. Relay 235 thereupon closes its upper contacts 236 and operates timing relay 240 which in turn at contacts 241 prepares a locking circuit, at contacts 242 opens the kickoff circuit, at contacts 243 operates timing relay 260, and at contacts 244 locks itself operated. Relay 260 upon operating, at break contacts 261 opens the circuit to relay 235 which restores and vibrates its weighted armature spring to start a timing operation for the previously mentioned kickoff circuit. Relay 240 being made sluggish, as by the use of a copper slug and sleeve on its core, will remain operated until the springs 236 have substantially stopped vibrating, and will maintain relay 260 also operated.

Meanwhile, the finder start relay 140 has operated in response to the ground forwarded over contacts 201 and 283, and at contacts 141 connects resistance 159 across leads 400 and 401 leading to the connector, thereby seizing the latter. At the same time, contacts 142 open a point in the release circuit, and ground the test lead 402 to the connector, while contacts 143 close a multiple holding circuit to relay 280, and contacts 149 open a point in the guard circuit. Relay 140 further, at make contacts 144—148 extends the finder control circuits from the allotter to the first linefinder mechanism, shown in Fig. 3.

Upon the closure of make contacts 141, line relay 420 of the connector operates, from ground and battery through its windings, break contacts 416, 417, 406, 407, talking leads 400, 401, resistor 159, and contacts 141. Line relay 420 in turn, at contacts 422 operates release relay 425, and at contacts 421 operates pulsing relay 410, which locks to resistance ground at its contacts 411. Release relay 425 operates hold relay 430 in obvious manner, and the latter, at contacts 431 and 432 grounds the test and hold leads 402 and 403.

The pulse motor 365 of the finder is now energized over the following circuit: ground through contacts 204 of the allotter start relay, contacts 211, 225, 251, lead 119, contacts 146, lead 194, and the windings of motor 365 to negative battery. Pulse motor 365, which may be of any desired type, but is assumed to be similar to that shown and described in British Patent 649,427, operates its shaft for a portion of a revolution in response to such energization, and at the same time causes a cam 397 to operate a set of motor interrupter contacts 396, 398. Contacts 396 are without effect at this time, but the closure of contacts 398 causes the operation of interrupter relay 210 in the allotter, from ground through contacts 398, lead 195, contacts 147, and lead 123. Relay 210 upon operating, opens the circuit to motor 365 at contacts 211. Pulse motor 365, in response to the de-energization of its windings, again rotates its shaft for a further portion of a revolution, whereupon motor cam 397 opens contacts 398 and re-closes contacts 396.

The gearing between the shaft of the pulse motor 365 and the primary shaft 355 is such, that for each two such steps of the motor shaft, the shaft 355 makes one-eleventh of a revolution. This brings the stud 381 of the first or left hand bevel gear 380 into alignment with the first trigger 382. It also moves the primary shaft off-normal cam 387 away from the associated off-normal contact springs 386, 388 which close. This is without effect at this time however, due to open contacts on the finder start relay 140. It also frees latch 366, and steps wiper 328 onto the first contact of marker bank 300, which contact is now marked with ground from contacts 113 of line relay 110, over cable 199.

Wiper 328 reaches the first contact of the marker bank in time to prevent the release of interrupter relay 210, which is now held in series with group test relay 220 over the following circuit: ground through contacts 113, 121, cable 199, the first contact of bank 300, wiper 328, break contacts 385, lead 193, contacts 145, lead 118, contacts 222, upper winding of relay 220, contacts 202, and the winding of relay 210 to battery.

Test relay 220 also operates in the foregoing circuit, after a short delay, and at preliminary make contacts 223 locks over its lower winding to ground at the allotter start relay through contacts 241, 261, 206. Contacts 223 also pass the same ground to the lower winding of line test relay 250, which is pre-energized thereby, but not sufficiently to operate the relay. Relay 220 further, at contacts 225 opens another point in the motor circuit, at contacts 224 opens the circuit to slow-release transfer relay 230, and at contacts 222 opens the circuit to interrupter relay 210, and prepares a circuit to the upper winding of line test relay 250, which winding is now short-circuited by ground on both terminals. Finally, relay 220, at its contacts 221 closes a circuit to transfer magnet 356, by way of contacts 231, lead 124, contacts 148, and lead 196.

Transfer magnet 356 operates over the foregoing circuit, and attracts its armature 357. Armature 357 now opens break contacts 385 to disconnect test wiper 328. Armature 357 at the same time pulls trigger bar 359 sharply to the left, whereupon the pivoted latch 366 drops into the notch 368 in the trigger bar, thereby locking the trigger bar, and the armature 357, in the operated position. As the trigger bar 359 moves to the left, the tip of the first trigger 382 strikes against the aligned stud 381 of the first bevel gear 380. The trigger 382 is accordingly turned on its pivot, and lifts the bevel gear 370 of the first group shaft into engagement with the first bevel gear 380 of the primary shaft.

Meanwhile, in the allotter, interrupter relay 210 has released, in response to the opening of its circuit at break contacts 222, but test relay 220 remains locked over its lower winding. Transfer relay 230 also releases, after a short delay, following the opening of break contacts 224, and opens make contacts 231, thereby de-energizing transfer magnet 356. The latter is locked mechanically in the operated position however, as previously explained, and is not affected. Relay 230 at the same time, at break contacts 232, re-closes the motor circuit.

Motor 365 is therefore again energized, and rotates its shaft for a further portion of a revolution, whereupon motor contacts 398 close and re-operate interrupter relay 210. Relay 210 in turn opens the motor circuit, whereupon the motor rotates its shaft for another portion of a revolution. Motor contacts 398 then open again and release relay 210 which again closes the motor circuit. Motor 365 and relay 210 continue to operate in this manner in search of the calling line. For each two forward movements of the motor shaft, the primary shaft 355, and the engaged group shaft 360(10) are rotated one full step, equal to one-eleventh of a revolution. Upon the completion of the first full step of shaft 360(10), the first cam 364(1) thereof moves the associated contact fingers 313(1) into engagement with the bare wires of the vertical multiple connected to line 11, and on the next eight steps, the other cams (not shown) on this shaft test lines 12 to 19 of the group in turn. Upon the tenth full step of shaft 360(10), the upper cam 364(0) causes the associated fingers 313(0) to make contact with line 10 which is the calling line, and the last line of the group.

Responsive to the operation of the contact fingers 313(0) by the cam 364(0), a circuit is closed for the line test relay 250 in series with the line-cutoff and lockout relays 120 and 130. This circuit is from ground at contacts 203, the upper winding of test relay 250, contacts 222, lead 118, contacts 145, leads 193, 312, the third contact finger 313(0), lead 102, contacts 122, 112, and the windings of relays 130 and 120 to battery. Relays 130 and 120 will not operate in this circuit due to the high resistance of relay 250. Test relay 250 operates quickly however, and at contacts 251 opens the motor circuit, and prepares a circuit to the finder switching relay 150. The lower winding of relay 250, although it does not receive sufficient current to operate the relay unaided, is able to maintain the relay operated independently of the upper winding. Interrupter relay 210 also restores, as the result of the final opening of motor contacts 398, and operates switching relay 150, from ground through contacts 204, 211, 232, 251, lead 117, and contacts 144.

It will be understood, of course, that if two or more lines of the same tens group initiate calls simultaneously, the group shaft will stop at the first one, and the others will be handled in turn by other finders, after the first finder has switched through.

Switching relay 150 upon operating, at contacts 157 opens a point in the holding circuit for distributor relay 280, at contacts 156 opens a point in the release circuit, at contacts 155 locks to connector ground on the hold lead 403, at contacts 154 extends the extra control conductor 404 for use as required, and at contacts 151, 152 extends the calling line talking leads 100, 101 to the connector, to hold the line relay thereof, independently of contacts 141. Relay 150 further, at contacts 153 operates the line-cutoff and lockout relays 130 and 120 from direct ground from the connector test lead 402 and from contacts 142, by way of contacts 153, lead 190, third contact finger 313(0), lead 102, and contacts 122 and 112. Relay 150 finally, at contacts 158 operates slow-release guard relay 215 in the allotter, and shunts down distributor relay 280. The circuit for operating relay 215 is from resistance battery through the primary and group shaft off-normal springs 386 and 376, lead 197, contacts 158, lead 125, contacts 281, and the winding of relay 215 to ground. The circuit for shunting down relay 280 is from the same battery through make contacts 281, make contacts 282, lead 116, contacts 143, lead 115, and the winding of relay 280 to battery.

The operation of the line-cutoff relay 130 disconnects and releases line relay 110 in obvious manner. Relay 130 also, at its preliminary make contacts 133 locks direct to test lead 102. Lockout relay 120, at contacts 122 opens its original operating circuit, and at contacts 121 prepares a locking circuit for itself, and disconnects this line circuit's start ground from the marking network, and from allotter start lead 103. The line relay 110 upon releasing, at contacts 111 disconnects direct ground from the connector test normal conductor 602, and replaces it with ground from test lead 102, through contacts 133.

In the allotter, the operation of guard relay 215 causes the release of start relay 200 in obvious manner, to insure the release of the allotter even if another call is waiting, in which case start lead 103 would still be grounded. Start relay 200 upon releasing, at contacts 201 opens the circuit to finder start relay 140, at contacts 202 opens another point in the group test circuit, at contacts 203 opens the line test circuit, at contacts 204 opens the operate circuit to relay 150, at contacts 205 disconnects battery from the open kickoff circuit, and at contacts 206 removes ground from relays 240 and 260, and from the locking windings of relays 220 and 250. Relays 140, 220, 240, 250 and 260 accordingly release. The circuit to guard relay 215 is also opened, upon the release of distributor relay 280, at contacts 281, and relay 215 also releases, after a brief delay period.

Distributor relay 280, upon releasing, also, at contacts 282 extends the circuit of guard relay 215 to the next idle finder, by way of the next operated distributor relay, at contacts 283 extends the now open finder start circuit to the next idle finder, and at contacts 284 and 285 prepares a reset circuit for the subsequent re-operation of relay 280. Fnder start relay 140 upon releasing, at contacts 141 disconnects resistor 159 from across the connector talking leads 400, 401, at contacts 142 prepares the release circuit, at contacts 143 opens the pull-up circuit for relay 280, and at contacts 144 to 148 opens the finder control circuits.

In case the finder should fail to find the calling line within a given time, for any reason, the timing relays will release the allotter, which will then re-operate, and pass the call to the next idle finder. As previously explained, timing relays 235, 240 and 260 operate, upon seizure of the allotter by a call, and 260 releases 235, whose weighted armature spring then vibrates to hold relay 240. If the call goes through normally, the allotter will release in the manner previously explained. Otherwise, relay 240 will hold for the full delay period of perhaps three or four seconds. When relay 240 finally releases, it closes a kickoff circuit to the involved distributor relay, such as relay 280. This circuit is from resistance battery through make contacts 205 of the start relay 200, break contacts 242, make contacts 262 and 282, lead 116, contacts 143, lead 115, and the winding of relay 280 to battery. Relay 280 is shunted down in this circuit, and relay 215 operates, and the allotter is released, and the call is passed to the next idle finder.

When the last idle finder is taken into use, all of the distributor relays 280—290 will be in the released position. A circuit for reset relay 265 will thus be closed, through chain contacts 285, 295 and similar contacts on the intervening distributor relays not shown. Reset relay 265 will operate over this circuit, and will re-operate all of the allotter relays whose associated finders are again idle, from ground at contacts 266, through break contacts such as 284, leads corresponding to 115 and 116 and contacts such as 157 on the various finder switching relays. Upon the re-operation of any relay 280—290, the chain circuit is again opened, and relay 265 releases. If all finders are still busy however, no relay 280—290 will be re-operated, and reset relay 265 will also remain operated. The all-trunks-busy relay 270 will accordingly release after a slight delay, and at contacts 271 will operate an all-trunks-busy meter not shown. If another call is initiated, during such a time when all trunks are thus busy, the allotter start ground on lead 103 would pass through break contacts 272 of relay 270, and operate an overflow meter not shown. The circuit to relay 200 is of course open at this time, at make contacts 272.

When the finder switching relay 150 operates, the control circuit for the connector line relay 420 is extended back to the calling line, as previously stated. The circuit for line relay 420 is now from ground and battery through the windings of this relay, through break contacts 416, 417, 406, 407, talking leads 400, 401, contacts 151, 152, leads 188, 189, contact fingers 313(0) of the first group shaft 360(10), the corresponding bare multiple wires 322(0), talking leads 100, 101, and over the calling line to the calling telephone. At the same time, dial tone from lead 502 at the upper left in Fig. 5 is passed back to this circuit by way of break contacts 516 and 521, and condenser 532.

The calling subscriber, upon hearing the dial tone, proceeds to dial the number of the wanted line, which will be assumed to be "2111." In response to the first digit "2," connector line relay 420 releases and re-operates twice. Relay 420 upon releasing, at break contacts 422 closes a priming circuit to relay 420 to aid in its re-operation, at make contacts 422 disconnects one of the multiple grounds from release relay 425, and at make contacts 421 opens the circuit to pulsing relay 410.

Pulsing relay 410 accordingly releases, and at make contacts 412 momentarily opens the circuit to release relay 425 which however remains operated during pulsing due to its being made slow to release. Relay 410 also at break contacts 412 closes a circuit to stepping magnet 465 of the ringing selection switch at the bottom of Fig. 4, as follows: ground through contacts 412, 433, 462, lead 483, contacts 573, 518, 523, lead 485, and the winding of magnet 465 to battery. A branch of this circuit also extends to the upper winding of transfer relay 504. Magnet 465 and relay 504 accordingly operate, and the latter, being slow to release, remains operated between pulses. Magnet 465 advances its wipers 472 and 473 one step, and closes its contacts 466. The minor switch off-normal contacts 468 and 469 also close.

Upon the re-operation of line relay 420, contacts 421 re-operate pulsing relay 410, from the ground at contacts 466 of the stepping magnet, and contacts 422 re-close the circuit to the release relay 425. Relay 410 locks as before and opens the pulsing circuit. Electromagnet 465 accordingly releases.

Upon the second pulse of the digit "2," relays 420 and 410 again release and re-operate in the same manner, and pass another pulse to magnet 465, which steps the wipers 472, 473 onto the second contacts of their bank. Transfer relay 504 restores after a brief delay following the last pulse, and at contacts 508 closes a circuit to local-call relay 515, from ground through wiper 472 over lead 492. Relay 515 thereupon operates, and at preliminary make contacts 519A locks over lead 488 to ground at make contacts 434 of the hold relay. Relay 515 also, at contacts 516 opens the dial tone circuit, at contacts 517 prepares a circuit for relay 510, at contacts 518 swtiches the pulsing circuit from magnet 465 to motor 665, at break contacts 519 disconnects release lead 585 from lead 487, and at make contacts 519 closes a release circuit to the auxiliary switch. This circuit is from ground through contacts 536, 519, lead 487, off-normal contacts 468, and release magnet 467 to battery. The auxiliary switch thereupon releases, and contacts 468 open the circuit to the release magnet.

In response to the second digit "1," the line and pulsing relays 420 and 410 release and re-operate once. Upon the release of relay 410 a circuit is closed to motor 665 as follows: ground through contacts 412, 433, 462, lead 483, contacts 573, 518, 541, lead 584, and motor 665 to battery. A branch of this circuit extends to both the upper and lower windings of transfer relay 504. Relay 504 accordingly operates, and at make contacts 505 operates transfer relay 510. The energization of the windings of motor 665 causes the motor to rotate its shaft for a portion of a revolution, whereupon interrupter contacts 696, 698, 699 are operated by motor cam 697. Contacts 696 and 699 are without effect at this time, but make contacts 698 prepare a circuit to the pulsing relay.

Upon the re-operation of line relay 420 therefore, pulsing relay 410 is re-operated, from ground at contacts 698, over lead 583 and contacts 421. Relay 410 in turn opens the circuit to motor 665 which, in response, again rotates its shaft for a portion of a revolution. Interrupter cam 697 thereupon opens contacts 698. This does not release pulsing relay 410 however, as the latter is now held operated by ground from its own contacts 411.

Like in the finder, the studs 681 on the different bevel gears 680 are so disposed about the circumference of the shaft that a different one of them is in alignment with its associated trigger 682 for each full step of shaft 655. Also like in the finder, the gearing between the motor shaft and the primary shaft is such that for each two part steps of the motor shaft, primary shaft 655 makes one full step, equal to one-eleventh of a full revolution. In the present case, the single full step taken by shaft 655 in response to the second digit, brings the left hand stud 681 into alignment with the first trigger 682. It also closes the primary shaft off-normal springs 688, and frees the latch 666, which moves down against the trigger bar 659.

Transfer relay 504 releases, shortly after the re-operation of pulsing relay 410 and opens the circuit of relay 510, which also releases after a further brief delay period. During the interval between the release of these two relays, a circuit is closed to transfer magnet 656, by way of contacts 505 and 512, and lead 581. Magnet 656 thereupon operates, and armature 657 closes contacts 629 and 649 and pulls trigger bar 659 to the left. The aligned stud 681 thereupon rocks the first trigger 682, and brings the bevel gear 670 of the first group shaft into engagement with the corresponding bevel gear 680 of the primary shaft. As the two gears become fully engaged, latch 666 drops into the notch 668 of the trigger bar and locks the latter, and the transfer magnet, in the operated position.

In response to the third digit "1," line relay 420 and pulsing relay 410 again release and re-operate once, and pass another pulse to motor 665, in the same manner as for the second digit, by way of contacts 412, 433, 462, 573, 518, 541 and pulse lead 584. Motor 665 rotates its shaft for a part of a revolution on the closure of its circuit, and again on the opening of its circuit, and drives primary shaft 655 a second full step. Shaft 655 in turn, drives the engaged group shaft 660(10) one full step, also equal to one-eleventh of a revolution.

Transfer relay 504 operates as before, in multiple with motor 665, and then releases, after a short delay, upon the cessation of the pulse. Since relay 515 is now held operated, the operation of relay 504 again operates transfer relay 510. Transfer magnet 656 and its contacts being now locked operated, digit-transfer relay 535 now operates in multiple with relay 510 over the following circuit: ground, contacts 505, 517, lead 582, contacts 629, lead 588, contacts 529A, 545, and relay 535 to battery. Relay 535, at contacts 536 removes ground from the auxiliary switch release circuit, and at contacts 537 prepares a circuit to relay 540, now shunted by ground on both sides of its winding. When relay 504 releases, it removes its own ground from this circuit, whereupon digit-transfer relay 540 operates in series with relay 535 and locks the latter operated, from hold-relay ground through contacts 434 on lead 488, and thence through relay 540, contacts 537, and relay 535 to battery. Relay 540 upon operating, at contacts 541 switches the pulsing circuit back to the auxiliary switch, at contacts 542 prepares a circuit for interrupter relay 530, at contacts 543 disconnects trunk call relay 520, at contacts 544 prepares the busy circuit, and at contacts 545 opens the operate circuit to relay 535.

In the cross-bar switch of Fig. 6, primary shaft 655 is now in its second position, and the group shaft 660(10) is in its first position. In this position of the group shaft 660(10), its off-normal cam 664(11) opens the off-normal contacts 676, and its first operating cam 664(1) causes the associated contact fingers 613(1) to engage the bare multiple wires 622(1) corresponding to the called line 11. The called line is not seized and made busy however, until after the final digit.

In response to the fourth and last digit "1," line relay 420 and pulsing relay 410 again release and reoperate, and pass an impulse of current to stepping magnet 465, by way of contacts 412, 433, 462, 573, 518, 541, and lead 485. The auxiliary switch accordingly again steps its wipers 472, 473 onto the first bank contacts. Wiper 472 is now without effect due to the open contacts 519B, but wiper 473 prepares the ringing circuit. Transfer relay 504 operates as before, in multiple with the pulsing circuit, and again operates relay 510, from contacts 505. Relay 504 at contacts 507 prepares a circuit for busy relay 460; and relay 510 at contacts 513 shunts break contacts 462 on the busy relay, to guard against premature opening of the pulsing circuit.

If the called line 11 is busy at this time, guarding ground on its test or CN conductor, will pass through its engaged test contact finger 613(1) in Fig. 6, and will operate busy relay 460 over test lead 580, contacts 544, lead 493, off-normal contacts 469 on the auxiliary switch, lead 494, contacts 507, lead 489, and the winding of relay 460 to battery. Relay 460 upon operating, at contacts 461 prepares the busy tone circuit, opens contacts 462 without effect as these contacts are now shunted by closed contacts 513, opens contacts 463 without effect, and at contacts 464 prepares its own locking circuit. Upon the release of relay 504 therefore, shortly after the cessation of the pulsing, relay 460 locks over leads 489 and 490, over the left hand break contacts 507 of relay 504 and contacts 464, to hold-relay ground at contacts 434. And upon the release of relay 510 shortly after the release of relay 504, contacts 513 thereof open the pulsing circuit, while contacts 511 thereof connect busy tone to the calling line from busy-tone lead 503, by way of lead 478, contacts 461 on the busy relay, lead 479, condenser 532, and the line talking conductors. The calling party will thereupon hang up and call again later.

If the called line is idle however, battery through its cutoff and lockout relays will be on its test conductor CN instead of ground, and consequently, busy relay 460 will not operate. Upon the release of transfer relay 504 however, a circuit will be completed for switching relay 570 as follows: ground through hold-relay contacts 434, lead 488, upper winding of relay 570, right break contacts 507, lead 494, auxiliary switch off-normal contacts 469, lead 493, contacts 544, test lead 580, third contact finger 613(1), the CN lead of line 11 corresponding to lead 602 of line 10 in Fig. 1, break contacts corresponding to contacts 111, and the windings of line 11's cutoff and lockout relays corresponding to relays 130 and 120 to battery.

Switching relay 570 operates in this circuit, and at its preliminary make contacts 575 connects its lower winding into the circuit. Relay 570 also, at contacts 571, 572 prepares the ringing circuit, at contacts 573 opens another point in the pulsing circuit, at contacts 574 connects direct ground to the test lead 580, thereby shunting its upper winding, at contacts 576 starts the ringing equipment, and at contacts 577 prepares a circuit for ring pickup relay 440. The line cutoff and lockout relays also operate in this circuit, and disconnect the associated line relay corresponding to relay 110 from the line. Contacts such as contacts 133 at the same time ground the C test lead corresponding to test lead 102, in the linefinder banks.

The ringing generator, and the ringing interrupter, not shown, start upon the closure of contacts 576, or are maintained in operation, if already started by a different call. Their form is immaterial, but they are assumed to be of the code ringing type, suitable for 10-party party lines. At the start of the next ringing cycle following the operation of relay 570, the ringing interrupter, in any convenient manner, will connect a short pulse of negative battery to the pickup lead PU, and a longer pulse of battery to the pickup hold lead 497.

Ring pickup relay 440 operates, in response to the pulse of battery on the PU lead, which passes through contacts 577, lead 498, break contacts of the make-before-break springs 441, and relay 440, to ground at contacts 434. Relay 440 thereupon at make contacts 441 locks to the battery on lead 497, and at contacts 442 prepares a circuit for ringing relay 550. Ground pulses from the interrupter corresponding to the first ringing code, also used for single party lines, now pass over ringing lead R1, through wiper 473, contacts 442, lead 499, contacts 564, and the winding of relay 550 to battery. Assuming the first code to be a single long pulse per cycle, ringing relay 550 responds to this impulse, and at make contacts 551 closes the ringing circuit. This circuit is from ringing generator current with superimposed negative battery on lead 553, through contacts 551, relay 560, contacts 562, 572, talking lead 501, the second contact finger 613(1), one side of the called line, the called line ringer, the other side of the called line, the first contact finger 613(1), talking lead 500, and contacts 571, 561 to ground. Relay 550 then releases for the silent period, and the interrupter unlocks pickup relay 440 at the end of each ringing cycle and reoperates it at the start of each succeeding cycle, to cause relay 550 to ring the called subscriber's bell intermittently at regular intervals. A portion of the ringing current leaks back into the calling line through condenser 565, to provide ring-back tone.

When the called line answers, whether during a ringing period or a silent period, ring-cutoff relay 560 operates over the ringing circuit from superimposed battery on lead 553 or battery through resistor 552, through the upper winding of relay 560, the hookswitch of the called telephone, and back to ground at contacts 561. Relay 560 upon operating, at preliminary make contacts 563 locks to hold-relay ground on lead 488, at contacts 561, 562 completes the talking connection between calling and called lines, and at contacts 564 disconnects ringing relay 550. Back bridge relay 445 now operates over the called line, and operates battery reversing relay 415 in obvious manner, and the latter reverses the battery feed to the calling line, for supervisory or other purposes, as may be required. The connector supplies talking battery to both calling and called lines, through the line and back bridge relays 420 and 445 respectively.

Upon the completion of the conversation, if the called party hangs up first, only the back bridge and battery reversing relays 445 and 415 restore. When the calling party hangs up however, line relay 420 releases, and causes the release of the connection. Line relay 420 first releases pulsing relay 410, which releases release relay 425, which releases hold relay 430. Relays 425 and 430 at contacts 426 and 432 remove ground from the test and hold leads 402 and 403 to start the release of the linefinder, and relay 430 at contacts 433 starts the release of the connector cross-bar mechanism, and at contacts 434 unlocks and releases the connector local call relay 515, digit transfer relays 535 and 540, ring-cutoff relay 560, and switching relay 570.

Responsive to the release of relay 515, release magnet 467 of the auxiliary switch is operated over the following circuit: ground, break contacts 412, 433, lead 585, break contacts 526, 519, and off-normal contacts 468. The auxiliary switch accordingly releases, and opens its off-normal springs.

Meanwhile, responsive to the release of relays 410 and 430, a homing circuit is also closed to motor 665 of the connector as follows: ground, break contacts 412, 433, lead 585 across Figs. 5 and 6, primary-shaft-off-normal contacts 688, motor interrupter contacts 696, and the winding of motor 665 to battery. Motor 665, upon being energized over this circuit, rotates its shaft for the usual portion of a revolution, and causes cam 697 to open interrupter contacts 696. Motor 665 is thereby de-energized and advances its shaft for another portion of a revolution. Contacts 696 close again, and re-establish the motor circuit. Motor 665 continues to operate in this manner and drives the primary shaft 665 and the engaged group shaft, to their home or normal positions.

In the illustrated embodiment of the invention, it has been assumed that the off-normal cam 687, and the corresponding cam 387 of the finder, are controlled by their respective primary shafts through gearing having a 2 to 1 ratio, such that the off-normal contacts 688 or 388 will open again only when the primary shaft has taken 22 full steps, or 44 partial steps, after leaving the starting position. It is also assumed that the off-normal contacts 664(11) or 364 (11) will again operate the associated contacts after the associated group shaft has taken 11 full steps after leaving its starting position. This arrangement causes the group shaft to always reach its home position first.

When the group shaft 660(10) reaches its home position, a stud 672 on the off-normal cam 664(11) becomes aligned with a hole in the frame, not shown, and the group shaft is withdrawn from engagement with the primary shaft, by spring action, and is locked in normal by the stud 672. Cam 664(1) also, upon reaching the home position, again closes contacts 676. And when the primary shaft 655 subsequently reaches its home position, cam 687 opens off-normal contacts 688, to open the motor circuit, while a similar cam, not shown, strikes the upper end of the latch 666 and lifts it out of the notch 668 of the trigger bar. Armature 657 thereupon returns trigger bar 659 to its original right hand position by spring action, and the connector is again normal.

The connector releases the line-cutoff and lock-out relays of the called line, upon the release of hold relay 430, by removing ground from test lead 580. The connector also releases the line-cutoff and lockout relays of the calling line, upon the restoration of release relay 425, by removing ground from test conductor 402. Hold relay 430 also removes ground from hold conductor 403. The linefinder switching relay thereupon unlocks and releases, and starts the release of the finder.

The finder switching relay 150 upon restoring, at its upper contacts opens the inter-switch trunk leads, at contacts 157 prepares the re-operation of distributor relay 280, now blocked by off-normal shunting battery, and at contacts 156 closes the finder homing circuit. This circuit is from ground through contacts 142, 156, lead 192, off-normal contacts 388, interrupter contacts 396, and motor 365 to battery. The motor 365, the cam 397, and the interrupter springs 396 thereupon co-operate to drive the primary and group shafts back to their home positions, in the same manner as described for the connector. When the group shaft 360(10) reaches its home position, off-normal contacts 376 again open, and disconnect their shunting battery from lead 197. The group shaft at the same time disengages itself from the primary shaft, and the stud 372 locks it in the normal position. When the primary shaft 355 reaches its home position, the off-normal contacts 386 and 388 again open. Contacts 388 open the motor circuit, and contacts 386 remove the final shunting battery from guard lead 197. Distributor relay 280 is now in condition to re-operate on the next reset operation, to again make this link available for seizure by a call.

The fourth, or extra control wire, in the vertical wire bank multiple of the linefinder, may be utilized to forward a special-service marking to the connector over lead 404. This would be done by connecting a jumper across the test and extra control bank terminals of this line, such as the jumper 319 shown at the upper left in Fig. 3. On a call from such a line, upon the operation of switching relay 150, test conductor ground on lead 402 would pass through contacts 153, lead 190, third contact finger, jumper 319, fourth contact finger, lead 191, and contacts 154 to lead 404. This extended ground would then operate certain relays, not shown, in the connector, to prepare any desired special service for this line, whenever a call is initiated thereby.

*P. B. X call*

In the connector, the fourth or extra control conductor may be utilized for causing the connector to hunt, as on trunk calls to a private branch exchange, or to another main exchange. In such a case, the test and extra control terminals of each trunk of a group, except the last, would be jumpered, or connected together.

Let it be assumed, for example, that the first three sets of line terminals in the last tens group, in the connector, are connected to trunks to a P. B. X, and that the first two of these trunks have their extra control and test leads connected together by a jumper such as indicated at 619. Let it also be assumed that the call number of this P. B. X is "2011."

Upon the seizure of the connector, relays 420, 410, 425 and 430 operate as for a local call, and on the first digit "2," relays 420 and 410 again pass two pulses to stepping magnet 465. Transfer relay 504 operates as before on the first pulse, in multiple with the pulse circuit and releases after the second and last pulse, whereupon wiper 472 operates local call relay 515, which locks, as before.

The second digit "0" now steps the motor 665 twenty short steps, and the latter drives the primary shaft 655 ten full steps, thereby bringing the last stud 681 at the right, into alignment with the last trigger 682. Transfer relays 504 and 510 operate as for a local call, on the first pulse, and release in sequence after the last pulse, during the inter-digital interval. Transfer magnet 656 thereupon operates, and pulls trigger bar 659 to the left, whereupon the aligned stud and trigger cause the shaft 660(00) to be moved into engagement with the primary shaft. The latch 666 locks the trigger bar as before.

The third digit "1" now steps the shafts 655 and 660(00) one full step, whereupon the cam 664(1) of the selected group shaft 660(00) moves the associated contact fingers into engagement with the terminals of the first P. B. X trunk. Transfer relays 504 and 510 operate on the first pulse and release after the last pulse. Digit transfer relays 535 and 540 are operated in succession, by the operation and release of relay 504, as previously explained, and transfer the pulsing lead back to the auxiliary switch.

If the first trunk to the P. B. X is idle at this time, nothing further happens until the final digit is dialled, when the connector switches through and rings on the first trunk, in the same manner as described for a local call.

If the first trunk is busy however, the operation of digit transfer relay 540 following the third digit, will cause the immediate operation of interrupter relay 530 from ground on the test wire of the first trunk, through the jumper 619 to the extra control wire, the extra control contact finger of the first trunk, contacts 649 on the transfer magnet, motor contacts 699, lead 587, contacts 542, and the winding of relay 530 to battery. Relay 530 in turn, at contacts 531 re-operates relays 504 and 510, and also connects a direct ground to motor 665 over lead 584. Motor 665 advances its shaft and causes cam 697 to open motor contacts 699. Contacts 699 in turn release interrupter relay 530, which then opens the motor circuit. The motor thereupon again advances its shaft, and re-closes contacts 699.

The cam 664(2) not shown, on the group shaft, now causes the associated contact fingers to engage the second trunk, while cam 664(1) disengages its contact fingers from the first trunk. If the second trunk is idle, the connector will stop, and will switch through and ring after the final digit has been dialled. If the second trunk is busy however, the foregoing action will be repeated, and the connector will step ahead one more step, onto the last trunk of the group. Since there is no extra-control jumper on the terminals of this trunk in the connector bank, the connector will stop, whether the trunk be busy or idle.

The final digit "1" will now again operate the stepping magnet 465 of the auxiliary switch, which will accordingly step its wipers onto the first bank contacts to select the first ringing code. The auxiliary switch at the same time closes its off-normal contacts 468, 469. Relays 504 and 510 again operate and release in the pulsing circuit. If the last trunk is busy, the resultant "busy ground" on test lead 580 will operate busy relay 460 by way of contacts 544, 469 and 507, as soon as off-normal contacts 469 close, and when relay 510 also restores, the calling party will hear the busy tone, via contacts 511, 461, and condenser 532. If the last trunk is idle however, battery instead of ground will be found on the test terminal, and busy relay 460 will be shunted. As soon as relay 504 restores therefore, following the final digit, switching relay 570 operates, as for a local call, from battery on test lead 580, through contacts 544, 469, 507, and upper winding of relay 570 to ground at contacts 434. The connector then rings over the P. B. X trunk, just as described for a local call, and when the P. B. X operator answers, the ring is stopped by the operation of ring-cutoff relay 560, which completes the talking connection as before.

*Trunk calls*

These circuits also provide for making trunk calls to other exchanges on a one-digit basis, the higher digits being used for this purpose. Let it be assumed for example, that the fourth group of line terminals in the connector are connected to trunks leading to another exchange, and that a call is to be extended thereto by dialling a first digit "0."

Upon the seizure of the connector in the manner already described in connection with local calls, the line, pulse, release and hold relays 420, 410, 425 and 430 operate as before. And when the first digit "0" is dialled, relays 420 and 410 release and re-operate ten times and pass ten impulses to pulsing lead 483, via contacts 412, 433 and 462. Transfer relay 504 operates as usual on the first pulse, and releases after the last pulse. The first six of these impulses are passed to the auxiliary switch stepping magnet 465, by way of break contacts 573, 518, 523, and lead 485. The auxiliary switch takes six steps in response, and when its wiper 472 lands on its sixth bank contact, it quickly operates trunk-call relay 520 over lead 491 and contacts 543.

Trunk call relay 520 upon operating, at preliminary make contacts 527 locks to the hold-relay ground on lead 488. Relay 520 also, at contacts 521 opens the dial tone circuit, at contacts 522 operates relay 510, and at contacts 523 opens the pulsing lead to stepping magnet 465 and extends it to lead 584 leading to motor 665, so that the latter will respond to the remaining pulses. Relay 520 further, at contacts 524 prepares a trunk hunting circuit, at contacts 525 prepares a circuit to relay 450, at contacts 528 prepares busy and switching circuits inedependent of the off-normal contacts 469 of the auxiliary switch, at contacts 529 prepares a circuit to interrupter relay 530, at contacts 529A disconnects relay 535, and at contacts 526 closes a circuit to the release magnet 467, from ground at contacts 536, by way of break contacts 519, lead 487, and off-normal contacts 468. The auxiliary switch thereupon releases, and opens its off-normal contacts.

Transfer relay 510, upon operating from contacts 522, at contacts 511 opens a point in the busy tone circuit, at contacts 512 prepares the circuit of transfer magnet 656, at contacts 513 shunts contacts 462 to prevent busy relay 460 from interfering with the pulsing, and at contacts 514 closes a circuit to the switch-through start relay 450, from ground at contacts 525. Relay 450 thereupon operates, and at contacts 451 prepares the operation of switch-through relay 405, now shunted by ground on both sides of its winding.

Meanwhile, responsive to the operation of relay 520, the last four pulses of the digit "0" are passed to the motor 665, over the following circuit: ground, contacts 412, 433, contacts 462 and 513 in multiple, contacts 573, break contacts 518, make contacts 523, and lead 584 to the motor. Motor 665 responds and drives primary shaft 655 four full steps, to select the fourth group shaft 660(40), not shown.

Transfer relay 504 now releases, shortly after the last pulse of the digit, and at contacts 505 operates transfer magnet 656, via contacts 512 and lead 581. Contacts 629 and 649 are thereby closed, and trigger bar 659 is pulled to the left and locked mechanically as before by the latch 666. The aligned fourth stud 681 and trigger 682, not shown, thereupon co-operate to move the selected group shaft 660(40), not shown, into engagement with the primary shaft.

Transfer relay 504 also, at break contacts 506 closes a circuit for interrupter relay 530, by way of contacts 524, lead 586, group shaft off-normal contacts 676 and similar contacts of the other group shafts, transfer magnet contacts 649, interrupter contacts 699, lead 587, and contacts 529. Relay 530 operates quickly over this circuit, and at contacts 531 re-energizes relay 504 and motor 665. Relay 504 re-operates, to hold relay 510. Motor 665 advances the primary shaft one-half step and the latter in turn advances the engaged group shaft one-half step. The motor cam 697 thereupon opens the circuit to interrupter relay 530 at contacts 699, while the off-normal contacts 676 of the engaged group shaft disconnect lead 587 from this circuit. Relay 530 accordingly releases, and disconnects its ground from motor 665. Motor 665 thereupon advances the two shafts another half step, and re-closes contacts 699. The first operate-cam of the selected group shaft now moves its contact fingers into engagement with the first trunk to the distant exchange.

The extra-control terminals of each trunk in such a trunk group, except the last, are connected to the corresponding test terminal, like P. B. X trunks, by a jumper such as 619. Further action will now depend on the busy or idle condition of the first trunk. If the first trunk is busy for example, ground on the test terminal will pass through the jumper to the extra-control terminal, and thence through contacts 649 and 699, lead 587, and contacts 529 to relay 530, thereby causing the re-operation of that relay. Relay 530 then re-operates and re-energizes relay 504 and motor 665. Relay 504 is thereby maintained operated, and motor 665 is caused to advance the primary and group shafts another full step, to test the second trunk. Busy relay 460 is also operated from the ground on the test conductor, by way of make contacts 528 and 507 but this is without effect, due to the open contacts 511 in the busy tone circuit. If the second trunk is also busy, the foregoing action is repeated and will continue until an idle trunk is found, or the connector reaches the last trunk in the group. As soon as an idle trunk is found, interrupter relay 530 will fail to re-operate, the stepping will stop, and the connector will switch the call through to the trunk.

If all of the jumpered trunks are busy, the connector will continue to step until the last trunk of the group is reached. Since the test and extra-control terminals of the last trunk are not jumpered together, there is now no circuit for interrupter relay 530. The connector will therefore stop on this trunk regardless of its idle or busy condition, and will switch through or return busy tone accordingly. If the last trunk is busy for example, busy relay 460 will be held by ground on test lead 580, from the outgoing repeater. Transfer relay 504 will restore, after a brief delay, following the cessation of the stepping and will lock up busy relay 460 over contacts 507, 464, 434. Relay 510 will also restore, after a further slight delay, and will complete the busy tone circuit through contacts 511, 461, and condenser 532.

If the last trunk is idle however, there will be no potential on its test terminal. Busy relay 460 will accordingly restore, and when transfer relays 504 and 510 also release after the usual slight delay, following the cessation of the stepping, relay 510, at its contacts 514, disconnects the shunting ground from switch-through relay 405. Relay 405 accordingly operates, in series with relay 450, and holds the latter also operated, over the following circuit: ground, contacts 434, relay 405, contacts 463, 451, and relay 450 to battery. Switching relay 570 does not operate, due to the absence of battery on test lead 580.

Switch-through relay 405 upon operating, at contacts 408 prepares a holding circuit, and at contacts 406 and 407 disconnects line relay 420 and extends the talking conductors 400 and 401 through to the outgoing repeater by way of leads 500 and 501, by-passing the talking condensers 435 and 436. This extension of a clear metallic path from the calling line to the repeater, causes the seizure of the repeater and the outgoing trunk, and the repeater thereupon returns holding ground over test lead 580. This ground passes through contacts 408 and 431 and locks hold relay 430 operated, in anticipation of the release of release relay 425.

Meanwhile, line relay 420 restores, in response to the opening of its circuit at contacts 406 and 407 of the switch-through relay, and releases pulsing relay 410. Relay 410 in turn, opens the circuit to the release relay 425, which also restores, after a short delay. The connection is now extended to the distant office, and is completed as required, either by further dialling or by an operator, according to the nature of the distant exchange. Talking battery for the calling party's transmitter is supplied from the outgoing repeater, not shown. The release is also controlled from the repeater, which on releasing removes ground from test lead 580. Hold relay 530 then releases, and the connector and finder are restored to normal in the same manner as described for a local call.

A first digit "8" or "9" would cause a similar operation of the connector, except that different trunk groups would be selected. A first digit "9" for example, would again operate trunk call relay 520 on the sixth pulse, but would then pass only three pulses to the motor 665. The primary shaft 655 would accordingly take only three steps instead of four, and would select the third group shaft 660(30), not shown. Similarly a first digit "8" would select the second group shaft 660(20), not shown. A first digit "7" would similarly select the first group shaft 660(10). In the illustrated embodiment however, this level would not be used for trunk calls, since it has been assumed to be assigned to subscribers lines.

It is possible of course to have outgoing trunks and local subscribers' lines in the same tens group, but the trunks must be assigned the first terminals of the group, in all cases, and only one trunk group can be assigned to any tens group. It will also be evident that the number of outgoing trunk groups can be varied by changing the connection of trunk call relay 520 in the bank of the auxiliary switch. If lead 491 were connected to the ninth bank contact for example it would be possible to assign trunks only in the first tens group, which could be reached by dialling "0." If on the other hand, lead 491 were connected to the third bank contact, it would be possible to assign trunks in the first seven tens groups, which would be accessible to the digits "4" to "0." And if a 13 point auxiliary switch were employed, it would be possible to assign trunks to any tens group.

In accordance with common automatic telephone practice, a first digit "1" is not to be used. If such a first digit should be received, by accident or otherwise, the auxiliary switch would of course respond, and would be stepped onto its first bank contacts, and close its off-normal contacts 468, 469. Relay 504 also operates from the pulse and then releases. As soon as relay 504 has released, contacts 509 thereof close a release circuit as follows: ground through wiper 472 and the first bank contact, lead 496, contacts 519B and 509, lead 495, and the winding of release magnet 467 to battery. Release magnet 467 then releases the auxiliary switch, which restores its wipers to normal, and again opens its off-normal contacts. A first digit "1" is thus simply absorbed by the equipment.

It will of course be understood, that while a particular embodiment of the invention has been illustrated and described, various modifications and re-arrangements are possible, without departing from the spirit and scope of the invention. Expansion of the system beyond 100 lines could of course be readily achieved by inserting selectors between the linefinders and connectors. These selectors could be of any type including selectors arranged similarly to Fig. 6, and having a similar hunting circuit, and a small number of relays.

What is claimed is:

1. Automatic telephone switching equipment including a switching link, a first switch for said link and contact banks therefore arranged in groups of contact sets, a plurality of line relays connected respectively to said sets, a primary shaft and group shafts and a stepping motor for said switch, an allotter, circuit means responsive to the operation of any one of said line relays for seizing said allotter, means responsive to the seizure of said allotter for seizing said link, circuit means responsive to the seizure of said link for causing said allotter to pass impulses to said motor to operate the same, means responsive to said motor operation for rotating said primary shaft, a commutator operated in unison with said primary shaft, stopping means in said allotter controlled by said commutator and said one line relay for stopping said impulses to stop said motor and said primary shaft, means responsive to said stopping of said primary shaft for selecting the required group shaft, coupling means in said switch operated responsive to the operation of said stopping means for coupling said selected group shaft with said primary shaft, circuit means in said allotter for automatically re-starting said impulses to cause said motor to rotate said coupled shafts in unison, sets of contact fingers operated in turn by said selected group shaft for testing the corresponding group of bank contact sets, other stopping means in said allotter controlled by said contact fingers and said one line relay for again stopping said impulses to stop said motor and said shafts when the contact fingers corresponding to said one line relay are operated, a second switch for said link, and a switching relay in said first switch operated responsive to the operation of said last stopping means for extending the connection from said last operated contact fingers to said second switch of said link.

2. Automatic telephone switching equipment as in claim 1 including, off-normal contacts for said shafts, and relay means in said allotter jointly controlled by said off-normal contacts and said operated switching relay for releasing said allotter, to enable its seizure and use by another line relay.

3. Automatic telephone switching equipment as in claim 1 including, a stopping circuit extending between said commutator and said allotter stopping means, an electromagnet in said switch operated by said stopping means for operating said coupling means, means controlled by said primary shaft for locking said electromagnet in the operated position until said primary shaft has been returned to its normal position, and contacts opened responsive to the operation of said electromagnet for disconnecting said commutator from said stopping circuit.

4. Automatic telephone switching equipment as in claim 1 including, a start relay in said allotter operated responsive to the seizure of said allotter for seizing said link, a motor circuit completed responsive to the operation of said start relay and said seizure of said link for energizing said motor, an interrupter relay in said allotter, means responsive to the energization of said motor for operating said interrupter relay, means responsive to said last operation for opening said motor circuit to de-energize said motor, means responsive to said de-energization of said motor for releasing said last relay to re-energize said motor, means responsive to the operation of said first stopping means for opening said motor circuit while said motor is de-energized, and other means controlled by said first stopping means for automatically re-closing said motor circuit after an interval.

5. Automatic telephone switching equipment including a plurality of switching links, a first switch for each link and contact banks therefor arranged in groups of contact sets, a set of movable contact fingers for each contact set, a plurality of line circuits connected to said contact sets and each having a line relay, a primary shaft and a plurality of group shafts for said switch for operating said contact fingers and a stepping motor for driving said shafts, an allotter for selecting said links for use in turn, means responsive to the operation of a line relay in any one of said line circuits for seizing said allotter, means responsive to said seizure of said allotter for connecting it to said selected link, an interrupter relay in said allotter, circuit means responsive to said seizure for causing said interrupter relay and said motor to interact to energize and de-energize said motor, means responsive to said energization and de-energization for rotating said primary shaft, means responsive to the rotation of said primary shaft for selecting one of said group shafts, a first stopping means in said allotter controlled by said rotating primary shaft for disabling said interaction circuit to stop said primary shaft in position to select the group shaft corresponding to said operated line relay, shaft coupling means in said switch, means responsive to said operation of said stopping means for operating said coupling means to couple said selected group shaft with said stopped primary shaft, means in said allotter for then re-enabling said interaction circuit to rotate said coupled shafts in unison, means controlled by said rotating group shaft for operating the associated contact fingers into engagement with the corresponding bank contact sets in turn, a second stopping means in said allotter controlled by said rotating group shaft for again disabling said interaction circuit to stop said group shaft when the bank contact set corresponding to said operated line relay is engaged by the corresponding contact fingers, a second switch for said link, a switching relay in said first switch operated responsive to said operation of said second stepping means for completing a connection from said one line circuit to said second switch through said engaged contact fingers, off-normal contacts for said coupled shafts, and a guard circuit jointly controlled by said off-normal contacts and said operated switching relay for releasing said allotter and for causing said allotter to be disconnected from said selected link.

6. Automatic telephone switching equipment as in claim 5 including, a distributor relay for said allotter for each said link, a selecting and a non-selecting position for each said distributor relay, means for maintaining said distributor relays normally in the selecting position when the associated link is idle, means including said off-normal contacts for connecting a potential to said guard circuit when said shafts leave their normal position, contacts closed by said operated switching relay for extending said potential to the associated distributor relay to move said relay to its non-selecting position, and allotter circuits responsive to said last relay movement for controlling the selection of another link for use by another of said distributor relays.

7. Automatic telephone switching equipment including a switching link, a first and a second switch for said link, a plurality of line circuits connected to said first switch, means responsive to the operation of any one of said line circuits for operating said first switch to extend a connection from said one line circuit through said first switch to said second switch, a plurality of group shafts for said second switch and a driving motor, means in said second switch responsive to a series of impulses received thereby over said extended connection for repeating said impulses to said motor to operate the same, means responsive to said operation of said motor for selecting one of said group shafts in accordance with the number of impulses received, coupling means, other means in said second switch also controlled by said impulses for operating said coupling means to couple said selected group shaft to said motor following the cessation of said impulses, an interrupter relay for said second switch, a circuit controlled by said operated coupling means for operating said interrupter relay, a circuit completed by said operated relay for operating said motor, means responsive to said operation of said motor for releasing said relay to again release said motor, means responsive to such operation and release of said motor to rotate said selected group shaft one step, shaft off-normal contacts opened in response to said step of said group shaft for opening said interrupter relay circuit, contact banks for said second switch including a plurality of contact sets accessible to said selected shaft, a set of contact fingers for each said contact set, and means responsive to said rotation of said selected shaft for operating the first set of said contact fingers into engagement with the corresponding contact set.

8. Automatic switching equipment as in claim 7 including, test terminals for said contact sets, a switching relay in said second switch, circuit means in said switch for operating said switching relay responsive to the presence of a particular electrical polarity on the test terminal of said engaged contact set for further extending said connection through said contact set, circuit means in said switch responsive to the presence of a different polarity on said engaged test terminal for re-operating said interrupter relay independently of said off-normal contacts to re-operate said motor, and means responsive to the re-operation of said motor for again releasing said interrupter relay and said motor to further rotate said shaft to similaly test the next contact set.

References Cited in the file of this patent

UNITED STATES PATENTS

| | | |
|---|---|---|
| 2,519,849 | Ostline | Aug. 22, 1950 |
| 2,679,552 | Jacobeus | May 25, 1954 |
| 2,758,157 | Gohorel | Aug. 7, 1956 |